3,409,573
PROCESS FOR THE PREPARATION OF VUL-
CANIZED POLYSILOXANE COMPOSITION
Paul Alfred Eugene Guinet and Robert Raphael Puthet,
Lyon, France, assignors to Rhone-Poulenc S.A., Paris,
France, a French body corporate
No Drawing. Original application Feb. 1, 1965, Ser. No.
429,679. Divided and this application Feb. 3, 1967, Ser.
No. 623,792
Claims priority, application France, Feb. 5, 1964,
962,735
4 Claims. (Cl. 260—18)

ABSTRACT OF THE DISCLOSURE

Vulcanized polysiloxane compositions are made by mixing an α,ω-dihydroxydioorganopolysiloxane, a crosslinking agent, and a composition made by reacting a diorganotin dicarboxylate with an orthotitanic ester.

---

This application is a division of my copending application Ser. No. 429,679, filed Feb. 1, 1965, now abandoned.

This invention relates to compositions containing titanium and tin, and to vulcanizable polysiloxane compositions containing the same.

Many organic compounds of titanium, more particularly the orthotitanic esters and their polycondensation products, have already been employed in polysiloxane compositions, e.g., in the production of coatings, either in the cold or by heating, and the preparation of water-proofing compositions. It has also been proposed to use orthotitanic esters, in association with cross-linking agents such as alkyl silicates, for effecting the conversion of linear siloxane polymers into elastic solids. In these compositions, the titanic esters act as catalysts. This conversion, which has been effected at ambient temperature, makes it possible to produce coatings, mouldings and caulkings on various supports, but unfortunately fairly long times, of the order of several hours, are required for complete vulcanization.

It is also known to vulcanize hydroxylated α,ω-diorganopolysiloxanes with alkyl silicates or polysilicates by catalyzing the reaction with an organic tin compound. The vulcanization of such mixtures is also fairly slow. In addition, for many applications, more particularly those carried out in the open air (e.g. public works, building and shipbuilding), the working conditions often exclude the use of products which solidify at relatively low temperature (e.g. about 0° C.), which limits the use of such tin compounds. This is the case in particular with tin catalysts such as dibutyl tin dilaurate, which has often been proposed for accelerating the setting of diorganopolysiloxanes.

It has now been found, and this forms the subject of the present invention, that compositions containing both the titanium and tin and useful, inter alia, for catalyzing the vulcanization at ambient temperature of organopolysiloxane compositions may be made by reacting a diorganotin dicarboxylate with an orthotitanic ester. Preferably a titanic ester of the formula Ti(OR)₄ is reacted with an organostannic compound of the formula:

(R'COO)₂Sn(R")₂ where R is alkyl of 1 to 6 carbon atoms, aminoalkyl of 1 to 6 carbon atoms, aryl such as phenyl, or aralkyl radical such as benzyl, and the R radicals may be linked in one or two pairs to form one or two alkylene radicals of 2 to 12 carbon atoms, each R' represents alkyl or alkenyl of 1 to 18 carbon atoms, phenyl or phenyl substituted by up to five, preferably one, alkyl radical of up to 6 carbon atoms each, or both the two R' radicals together represent a divalent hydrocarbon radical of 1 to 18 carbon atoms and up to three double bonds, and R" represents alkyl of 1 to 18 carbon atoms, aryl or aralkyl, more particularly phenyl, alkylphenyl of 7 to 12 carbon atoms, or phenylalkyl of 7 to 12 carbon atoms, especially benzyl. Preferably R' is alkyl of 1 to 18 carbon atoms, R" is alkyl of 1 to 6 carbon atoms, and R is alkyl of 1 to 6 carbon atoms, aminoalkyl of 1 to 6 carbon atoms, or benzyl, or the R radicals are linked together in pairs to form two alkylene radicals of 2 to 12 carbon atoms each. The diorganotin dicarboxylate employed as starting materials may thus be, for example, diethyl tin, dibutyl tin or dioctyl tin diacetate, dipropionate, dibutyrate, dioctanoate, dilaurate, dibenzoate, succinate, glutarate, adipate, maleate or fumarate.

The reactants, i.e. the titanic ester and the organotin carboxylic salt, may be reacted either in the absence of diluent or in a liquid organic diluent which is inert under the operating conditions, preferably at 50° to 150° C., especially 100° to 120° C. If a diluent is used, a benzene hydrocarbon, an ether or a volatile petroleum fraction is preferably employed.

By this reaction, compositions are formed which, regardless of the proportions of reactants, contain units of the formula:

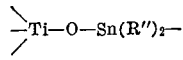

in which the residues attached to the titanium atoms are of formula: —OR or —O—Sn(R")₂—, and the residues attached to the tin atoms are of formula:

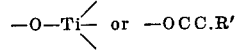

an ester of the formula: R'COOR being produced as by-product. The precise structure of the compositions will vary in accordance with the proportions of reactants, and in practice mixtures of products of different structures are generally obtained. The molecular proportions of the reactants conveniently range from 2:1 to 1:2, but in some cases it may be preferable to use proportions which depart further from equimolecular proportions. When less than 2 molecules of diorganotin dicarboxylate are used for each molecule of orthotitanic ester, compositions are obtained containing no acyloxy radicals R'COO.

The compositions produced by the aforesaid process are themselves within the scope of the invention and it will be understood that more than one reactant of each kind may be used in the process if desired.

The ester of the formula R'COOR which is formed in the reaction may, if desired, be eliminated, for example by distillation, as it is formed. However, it may also be left in the composition if its presence will not interfere with the subsequent applications of the product.

The new compositions may be used as catalysts in vulcanizable polysiloxane compositions comprising an α,ω-dihydroxydiorganopolysiloxane and a cross-linking agent. Preferably the cross-linking agent is an orthosilicate or polysilicate ester, an organotrialkoxysilane type, such as, for example, methyl- or ethyltriethoxysilane, or an organotriacyloxysilane, such as, for example, methyltriacetoxysilane and its homologues.

Any α,ω-dihydroxydiorganopolysiloxane usually employed in vulcanizable compositions will benefit by the use of the compositions of the invention. They do not need to be further described as they are now well known. It is likewise to be understood that the new vulcanization catalysts of the invention are compatible with fillers such as various forms of silica, ground quartz, alumina, titanium dioxide, calcium carbonate, graphite, carbon black, cork powder, polyvinyl chloride, the liquid organic diluents and various pigments usually employed in vulcanizable compositions of the aforesaid type.

For the preparation and application of the vulcanizable compositions comprising the new catalysts, any method in use for similar cases may be employed. The catalyst is added last, either as such or in the form of a solution in an inert organic solvent, or in any other desired form, provided that the procedure adopted is not likely to give rise to premature vulcanization. The proportion of composition of the invention used as catalyst will ordinarily be from 0.1 to 10% by weight.

The following examples illustrate the invention.

EXAMPLE 1

Into a round-bottomed flask provided with a reflux condenser and a thermometer tube is introduced a mixture of 315 g. of dibutyl tin dilaurate and 170 g. of butyl orthotitanate, and the mixture is then heated for 2 hours at 110–120° C. A clear liquid is obtained, which has a viscosity of 17 cst. (centistokes) at 25° C., and which solidifies at −14° C. 386.5 g. thereof are heated in the mass under 0.1 mm. Hg to 150° C. 198 g. of liquid are thus distilled off identified as butyl laurate (B.P. 0.1 mm. Hg=90–95° C.). The remaining product consists of a liquid having a viscosity at 25° C. of 1950 cst. Percentage analysis shows that it is a product of the empirical formula: $C_{16}H_{36}O_4SnTi$ and its infrared spectrum shows a wide absorption band situated between $12\mu$ and $13\mu$ attributable to the Sn—O—Ti linkage.

EXAMPLE 2

A mixture of 86.5 g. of dibutyl tin dilaurate and 23.5 g. of butyl titanate is heated for 4 hours at 120° C. Some of the homogeneous liquid obtained is heated in vacuo as in Example 1 and the distillate is identified as butyl laurate. The remaining product is a clear liquid having a viscosity of 270 cst. at 25° C.

EXAMPLE 3

5 g. of crude reaction product prepared as in Example 1 and containing 2.45 g. of the non-volatile composition are added to a mixture of 100 g. of an α,ω-dihydroxydimethylpolysiloxane oil having a viscosity of 5000 cst. at 25° C. and 5 g. of ethyl polysilicate (corresponding to an $SiO_2$ content of 40%). The mixture is placed in a dish in which a mass 1 cm. thick forms. After 8 minutes, the mass is completely solidified and can be readily removed from the mould.

If the product obtained in Example 1 is replaced by an equal weight of one of the following products, the following setting times are observed:

Setting time
Butyl titanate _____days__ 5
Dibutyl tin dilaurate _____hours__ 22
Simple mixture of the reactants in the proportions of
  Example 1, prepared in the cold _____do____ 19

The above results indicate that the titanium-tin derivatives have, with respect to the mixture of the siloxane oil and ethyl polysilicate, a higher catalytic activity than the catalysts hitherto employed for this purpose.

EXAMPLE 4

A mixture similar to the mixture of Example 3 is prepared, but the 5 g. of crude product obtained in accordance with Example 1 are replaced by 2.5 g. of the non-volatile composition obtained in accordance with Example 1. The mixture obtained solidifies as rapidly as with the crude catalyst.

EXAMPLE 5

Into a 250 cc. round-bottomed flask provided with a stirrer, a thermometer, a reflux condenser connected to a drying tube, and a dropping funnel, are introduced 14.3 g. (0.03 mole) of benzyl titanate liquefied by heating. 37.9 g. (0.06 mole) of dibutyl tin dilaurate are then added. The mixture is maintained at a temperature of 115°±5° C. for 3 hours and then allowed to cool. The crude product obtained may be used as a catalyst as such.

EXAMPLE 6

Into the same apparatus as that described in Example 5, 92.75 g. of dibutyl tin dilaurate and 50 g. of triethanolamine titanate are introduced. The reactants are heated for 3 hours at 115°±5° C. (The 50 g. of titanate contain 0.0735 gram-atom of titanium and the 92.75 g. of dibutyl tin dilaurate contain 0.147 gram-atom of tin.) The crude product obtained may be used as catalyst as such.

EXAMPLE 7

In the same way as in Example 6 a mixture consisting of 28 g. (0.1 mole) of hexyleneglycol titanate, $$Ti(C_6H_{12}O_2)_2$$

and 126.2 g. (0.2 mole) of dibutyl tin dilaurate is heated for 3 hours at 110–120° C. and then allowed to cool. The product obtained may be used as such as a catalyst.

EXAMPLE 8

Into a 1-litre round-bottomed flask equipped as in Example 5, 340 g. of butyl orthotitanate (1 mole) and 351 g. of dibutyl tin diacetate (1 mole) are introduced. The mixture is heated at 120° C. for 3 hours with stirring and then cooled in an inert atmosphere.

A clear liquid of straw-yellow colour is obtained having a solidification point below −30° C., a density $d_{20}=1.365$, a refractive index $n_D^{20}=1.4773$, and a viscosity at 20° C. of 9.25 cst.

EXAMPLE 9

An organosilicon composition is prepared with the following constituents taken in the stated proportions by weight.

|  | Percent |
|---|---|
| α,ω-dihydroxydimethylpolysiloxane oil containing 0.2% of terminal OH groupings and having a viscosity of 5000 cst. at 25° C. | 70 |
| Precipitated activated calcium carbonate | 27.9 |
| Ethyl polysilicate, titrating 40% of $SiO_2$ | 2.1 |

25 g. of this composition are placed on a glass plate and there is incorporated therein while rapidly stirring with a spatula, 0.125 g. (i.e. 0.5% by weight of the composition) of one of the catalysts indicated in the first column of the following table. The mixture thus prepared is placed in a dish so as to form a homogeneous mass 1 cm. thick. A similar experiment is then carried out for each of the catalysts of the following table, and the following results are obtained:

| Catalyst | Time necessary before mould release | Shore hardness | |
|---|---|---|---|
| | | 1 hour after mould release | 24 hr. after mould release |
| Dibutyl tin dilaurate | 7 hr., 45 min. | 7 | 42 |
| Crude product of Example 1 | 30 min. | 27 | 41 |
| Crude product of Example 2 | 50 min. | | 43 |
| Product of Example 5 | 50 min. | 24 | 44 |
| Product of Example 6 | 1 hr., 50 min. | 18 | 43 |
| Product of Example 7 | 2 hr., 50 min. | 12 | 43 |
| Product of Example 8 | 45 min. | 27 | 40 |
| Mixture of Example 1 before reaction. | 5 hr., 30 min. | 5 | 35 |
| Mixture of Example 2 before reaction. | 6 hr. | 6 | 38 |

We claim:
1. Process for the preparation of a vulcanized polysiloxane composition which comprises mixing (a) an α,ω-dihydroxydiorganopolysiloxane, in which the organic groups are hydrocarbon groups, (b) as cross-linking agent an orthosilicate or polysilicate ester, an organo-trialkoxysilane, or an organotriacyloxysilane, and (c) a composi- tion containing titanium and tin made by reacting at 50° to 150° C. a diorganotin dicarboxylate of the formula:

$$(R'COO)_2Sn(R'')_2$$

in which taken separately each R' is a member selected from the group consisting of alkyl and alkenyl of 1 to 18 carbon atoms, phenyl, and phenyl substituted by up to five alkyl radicals of up to 6 carbon atoms each, and taken together the two R' radicals represent a divalent aliphatic hydrocarbon radical of 1 to 18 carbon atoms and up to three double bonds, and R'' represents a member selected from the group consisting of alkyl of 1 to 18 carbon atoms, phenyl, alkylphenyl of 7 to 12 carbon atoms, and phenylalkyl of 7 to 12 carbon atoms, with an orthotitanic ester of formula:

$$Ti(OR)_4$$

where R is a member selected from the class consisting of alkyl of 1 to 6 carbon atoms, aminoalkyl of 1 to 6 carbon atoms, phenyl and benzyl, and the R radicals may be linked in one to two pairs to form one to two alkylene radicals of 2 to 12 carbon atoms each.

2. Process according to claim 1 in which the α,ω-dihydroxydiorganopolysiloxane is an α,ω-dihydroxydimethylpolysiloxane.

3. Process according to claim 1 in which the crosslinking agent is ethyl polysilicate, methyl- or ethyl-triethoxysilane, or methyltriacetoxysilane.

4. Process according to claim 1 in which R' is alkyl of 1 to 18 carbon atoms, R'' is alkyl of 1 to 6 carbon atoms, and taken separately each R is alkyl of 1 to 6 carbon atoms, aminoalkyl of 1 to 6 carbon atoms, or benzyl and taken in pairs the R radicals form two alkylene radicals of 2 to 12 carbon atoms each.

References Cited

UNITED STATES PATENTS

| 3,127,363 | 3/1964 | Nitzsche et al. | 260—46.5 |
| 3,151,099 | 9/1964 | Ceyzeriat et al. | 260—46.5 |
| 3,178,375 | 4/1965 | Rust et al. | 260—46.5 |

FOREIGN PATENTS

| 421,512 | 3/1967 | Switzerland. |

DONALD E. CZAJA, *Primary Examiner.*

M. I. MARQUIS, *Assistant Examiner.*